United States Patent [19]
Hyatt

[11] Patent Number: 5,953,854
[45] Date of Patent: Sep. 21, 1999

[54] GRANULAR BAIT STATION

[75] Inventor: Stephanie H. Hyatt, San Ramon, Calif.

[73] Assignee: The Clorox Company, Del.

[21] Appl. No.: 08/767,264

[22] Filed: Dec. 13, 1996

[51] Int. Cl.⁶ .................................................. A01M 1/20
[52] U.S. Cl. ............................................................ 43/131
[58] Field of Search ........................................ 43/121, 131

[56] References Cited

U.S. PATENT DOCUMENTS

| | | | |
|---|---|---|---|
| 649,484 | 5/1900 | Schlachter | 43/121 |
| 918,523 | 4/1909 | Fly | 43/121 |
| 1,372,780 | 3/1921 | Schenke | 43/121 |
| 1,770,330 | 7/1930 | Warden | 43/121 |
| 1,887,771 | 11/1932 | Marsh | 43/131 |
| 2,060,245 | 11/1936 | Rosefield | 43/131 |
| 2,664,663 | 1/1954 | Mullen | 43/131 |
| 2,710,485 | 6/1955 | Starr | 43/131 |
| 2,953,868 | 9/1960 | Chambers | 43/131 |
| 4,173,093 | 11/1979 | Nakai | 43/121 |
| 4,251,946 | 2/1981 | Lindley | 43/131 |
| 4,277,907 | 7/1981 | Ernest | 43/131 |
| 5,148,625 | 9/1992 | Saleman | 43/121 |

*Primary Examiner*—Kurt Rowan
*Attorney, Agent, or Firm*—Harry A. Pacini

[57] ABSTRACT

A spill resistant insect bait station having a tunnel entrance leading to an interior bridged member having a continuous inner wall leading from the base or bottom surface up to an upper inner surface having an access opening in the bridge member leading to a bait source contained in the interior of the station, the interior of the station having an inverted concave shape, so as to provide for holding the bait available for the insect; a corresponding cover having a recessed portion thereon closely cooperating with the access opening in the base by which the insect can climb the inner wall of the base to enter the station to retrieve the bait and then exit the station carrying bait back to the insect habitat.

8 Claims, 4 Drawing Sheets

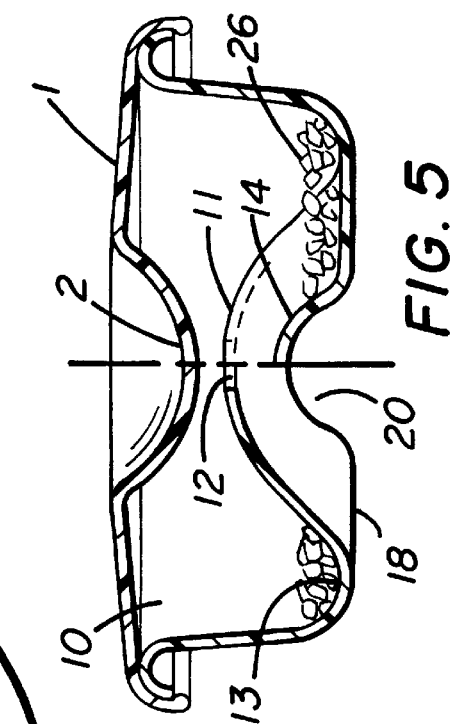
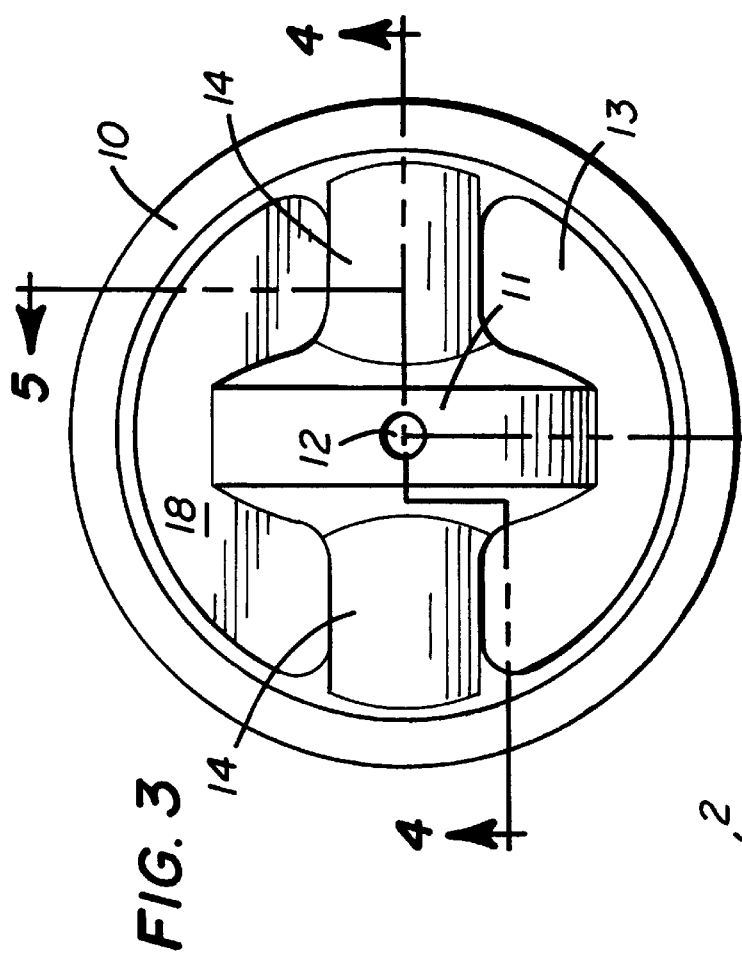
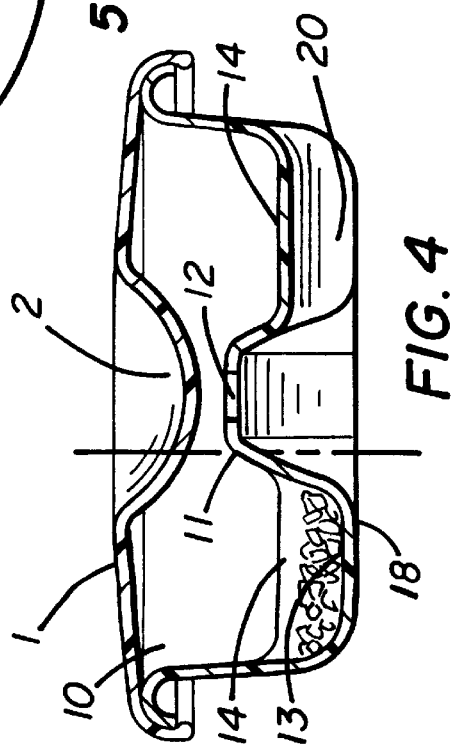

GRANULAR BAIT STATION

BACKGROUND OF THE INVENTION

This invention relates to a device for destroying insects. More particularly, the invention relates to an insect bait station whereby granules containing poison may be administered to insects and whereby insects will remove poison containing material from the station and carry the material back to the insect habitat for feeding of other insects thereby killing other insects. This is done with a spill resistant station configuration minimizing the risk to children or domestic animals. The station of this invention has means for guiding said insects to the poison containing bait.

Various types of devices have been known in the prior art for destroying insects. In some devices, the insects are trapped in the device after entering, either by mechanical construction, or by sticking to a gummy substance. In either instance, such prior art device is soon full and useless. In devices which contain a poison, the devices were not appropriate for granules because either it was easy to shake out loose poison, or probe through openings to reach the poison, thus making them a danger to children or small domestic animals. In addition, prior devices are generally of a construction that the interior of the device is difficult to view so that it is not readily ascertainable whether insects are using the device or how much poison has been used.

U.S. Pat. No. 4,173,093 relates to a catching device for cockroaches. This device is a trap as opposed to the bait station of the present invention. The insect moves across the supporting surface beneath the device and between the lower surface of the floor portion of the device. This permits the cockroach to enter the central axial opening into the device housing. The cockroach is lead through a passage way into the central portion of the device trapping the insect.

U.S. Pat. No. 4,263,740 relates to a crawling insect trap wherein the device is designed so that either upon exiting or entering the center opening of the annular flange to retrieve food the insect will fall back into the trap.

Other bait stations in the prior art are of the type wherein a series of guides and baffle means guide the crawling insect through openings in the periphery of the station to the central point area, for example, U.S. Pat. No. 4,563,836 and U.S. Pat. No. 4,837,969. Such stations must contain bait which is not granular. The bait therein is preferably of a paste-like or solid "cookie" consistency.

It is therefore an object of this invention to provide an insect bait station suitable for granular baits, which is attractive to the feeding insect and has external means for guiding the insect to the bait.

It is therefore an object of this invention to provide an insect bait station which is substantially spill resistant and attractive to the feeding insect.

A further object is to provide an insect feeding station which minimizes risk to children or pets.

A further object is to provide an insect feeding station in which it is readily possible to detect the use of the poison bait.

Another object is to provide an insect bait station with means for guiding insects toward the poison-containing bait and to allow insects to carry said bait away from the station back to the insects' nest.

These and other objects of the invention will become apparent as the description thereon proceeds. The objects of this invention may be attained and the disadvantages of the prior art trapping devices are overcome by the use of the present invention. The device of the present invention has a base portion for holding a poison bait and a cover therefor. The bait station comprises a base with a tunnel entrance having an opening at each end, a center mound therein cooperating with said tunnel entrance, with an internal opening as an entry port or access port, for insect access to the bait inside the base. In the preferred embodiment the bait station has a continuous cover with a central depression cooperating with and in close proximity to the internal opening in the center mound, to restrict the spillage of granules out of the station. The base may be of any configuration, e.g., round, oval, square, rectangular, or hexagonal and the like; however, it is necessary for the corresponding cover to contain a depression to cooperate with the internal opening to deflect granules away from the entry port if the station is tilted or shaken.

The poison is preferably formulated in a composition of the type known as bait, i.e., it is a mixture of poison in admixture with a food material attractive to the target insects, such as, but not limited to, flour, molasses, peanut butter, citrus pulp, animal fats such as lard and tallow, with an organic filler such as bran, and crushed puffed grain, pregel defatted corn cob grits or a starch matrix are also useful. The bait is preferably granular or paste-like. Other additives can be added to the formulation of the bait, for example, dry pupa of silkworm, various animal digestive parts, such as freeze dried poultry liver, and the like.

It is preferable to formulate ant baits with a matrix material. The ideal matrix material for the bait for use in the instant bait station would be one that can be picked up by the foraging insect and carried back to the nest to be passed around to other insects. Contact insecticides would not generally be suitable, unless a slow-acting contact poison were used, since the bait material as used in this invention would best be useful for killing foragers and for bringing poison to a colony. Sulfimide, hydramethylnon, and avermectin are examples of suitable insecticides. Preferably, the insecticide constitutes 0.2–10% by weight of the bait.

The instant bait station is particularly useful for supplying bait to insects. The insect baits of this invention are especially effective for the control of ants, such as, but not limited to, the southern fire ant [*Solenopsis xyloni*], leaf cutting ants [*Acromyrmex versicolor*], Argentine ants [*Iridomyrmex humilis*], cornfield ants [*Lasius alienus*], pavement ants [*Tetramorium caespitum*], larger yellow ants [*Acanothomyops interjectus*], thief ants [*Solenopsis molesta*], and the red and black imported fire ants [*Solenopsis invicta*] and [*Solenopsis saevissma richteri*], respectively. These ants are serious economic pests which have been known to harm human beings, livestock, and agronomic crops. Therefore, it is highly desirable to control them. Other ants that can be controlled are nuisance pests such as Pharaoh ants [*Monomorium pharaohnis*], odorous house ants [*Tapinoma sessile*], and acrobat ants [*Crematogaster cerasi*].

The base may be formed as a unitary piece from a deformable material, such as a plastic, by known methods. One method for forming the base is from a flat sheet of plastic which is either thermoformed or vacuum formed over a suitably designed mold to form a bridged tunnel within the base which acts as a receiving area for the bait. It is also possible to form the base by injection molding of a molten plastic into a suitably designed mold. The cover of the device is also formed in like manner as a unitary piece which is attached to the top of the device to prevent access by children via the cover. The cover is preferably permanently affixed to the top of the device. The cover is permanently affixed to the base and, optionally may have at least a part which is transparent so that the poison bait is visible through the cover.

The insect bait station of the present invention can be made of paper, wax, plastic, or metal, provided the sloping inclines and declines are of a material which will allow the insect, particularly ants, to efficiently walk thereupon to access the poison containing bait in the interior of the station and to exit the station and return to the nest. Although any of the enumerated materials will suffice, moldable plastic, such as polystyrene, would be preferred.

In one embodiment of the present invention, the cover which is affixed to the base has at least a section thereof which is transparent, so that the poison is visible therethrough. Alternatively, the entire cover may be transparent. In this latter embodiment, it may be desirable to color the floor of the compartment with a contrasting color before filling the bait station, and more desirably the contrasting color may be luminous so that it is readily visible in darkened areas. As bait is removed by insects, the contrasting color underneath becomes visible and provides an indication whether insects are using the station and how much bait has been used.

In an alternative embodiment of the present invention, the insect access port in the base remains closed and sealed until a user opens the access port, such as by punching a perforated hole or removing a cover. This embodiment prevents spillage or degradation of bait prior to use for insect feeding.

SUMMARY OF THE INVENTION

The insect bait station of the present invention obviates deficiencies for granular baits of prior art station traps for ants and other crawling insects by providing a bait station for granules having a continuous outer wall leading from the base or bottom edge up to an inner upper surface having an opening therein leading to a bait source contained in the interior of the station. The base of the station is molded as a tunnel with an overlying bridge arrangement. The interior of the station has an interior concave area surrounding the molded tunnel and bridge, such as a bowl shape so as to hold a concentration of the bait. The base is covered with a suitably shaped cover with a depression therein which communicates in close proximity with the access opening or orifice in the bridge portion of the base. Further provided that the insect can climb the inner wall from the tunnel opening to the base to enter the station by the access opening in the bridge portion to retrieve the bait and then turn around to exit the station carrying bait back to the insect habitat. Preferably, the bait station is circular with an upper cover surface with a central depression therein to closely cooperate with the access opening in the bridging portion in the interior of the station.

DESCRIPTION OF THE DRAWINGS

As seen in the drawings:

FIG. 3 is a top plan view with the cover removed.

FIG. 4 is a half side-elevational view in section taken along lines 4—4 of FIG. 3.

FIG. 5 is a half side-elevational view in section taken along lines 5—5 of FIG. 4.

DETAILED DESCRIPTION OF THE PREFERRED EMBODIMENTS

Figure 1:
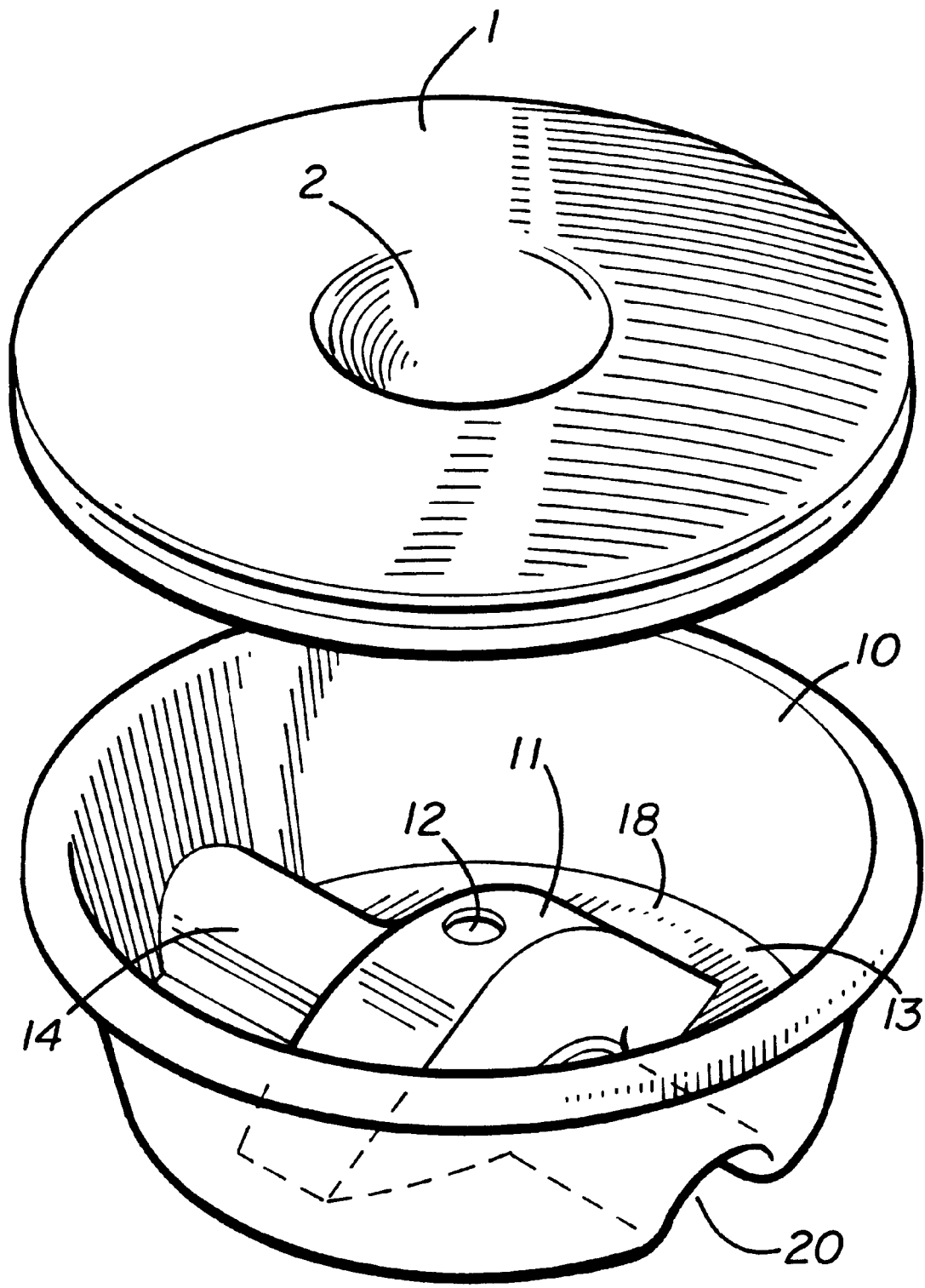
FIG. 1 is an exploded perspective view of an insect bait station according to the present invention.
Figure 2:
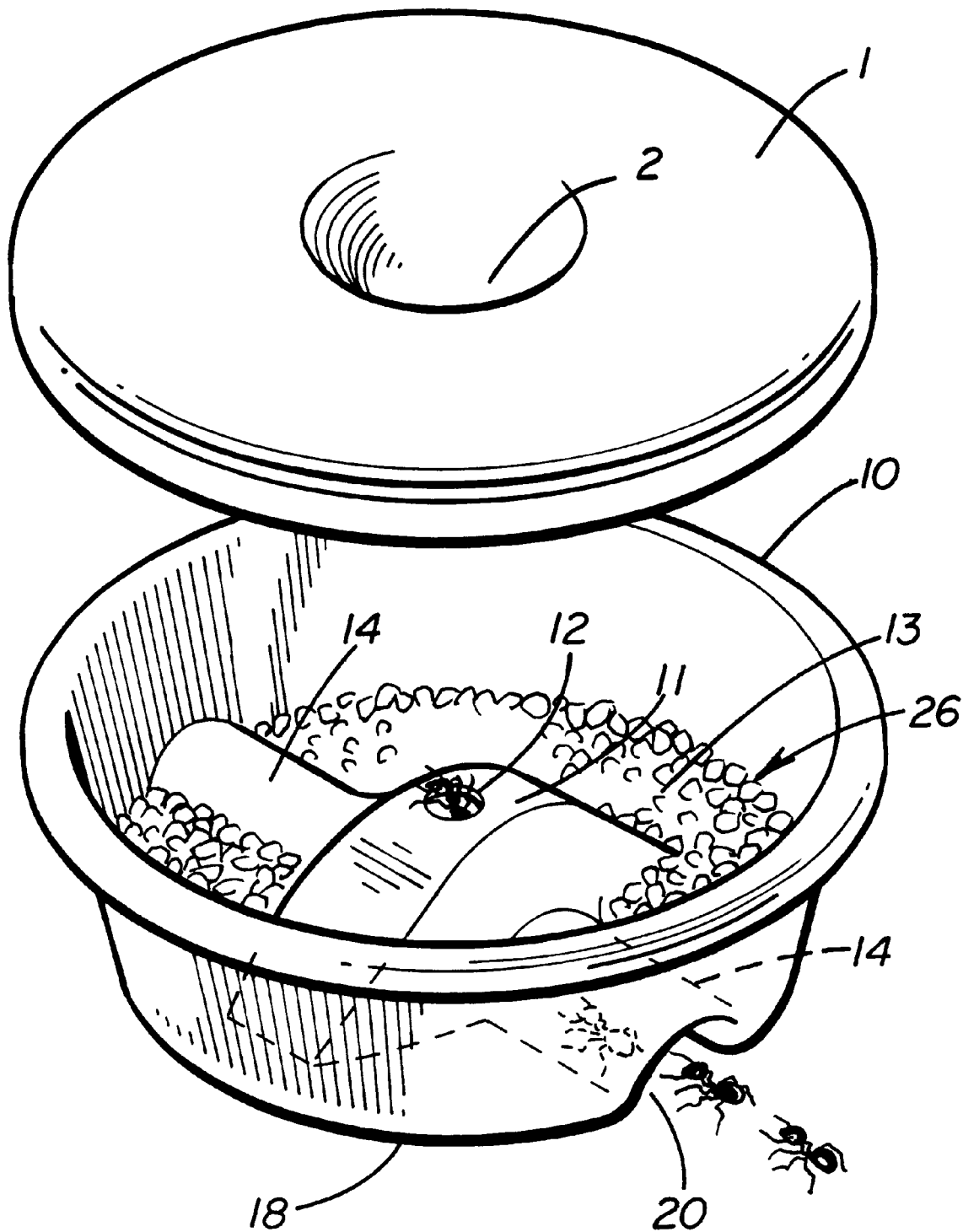
FIG. 2 is an exploded pictorial perspective view of an insect bait station, with a typical crawling insect, such as an ant, entering the bait station with bait present according to the present invention.

With reference to the drawings, wherein like parts are indicated by like reference numbers, embodiments of the insect bait stations of this invention is generally shown. FIG. 1 and FIG. 2 show a preferred embodiment of the apparatus 10 for receiving a bait which contains an insecticidal ingredient according to this invention. The station includes a base member 10 and a cover member 1.

The base member 10 has a tunnel 14 formed in the bottom of the base with a transverse or perpendicular bridge member 11. The tunnel 14 has an exterior entrance 20 at each end. The bridge member 11 has a substantially centrally located access port 12 leading to the interior of the base 10. Said bridge member having a continuous inner wall leading from the base or bottom surface up to an upper inner surface to the access opening, and leading to a bait source contained in the interior of the station. The interior of the base is a concave receptacle 13 for holding granular bait. The cover 1 conforms in shape to the base 10. The cover contains a depression or indentation 2 positioned so as to cooperate with the access port 12 in the base 10. In cooperating together, the depression 2 and the access port 12, the base portion may be of any suitable material, such as metal or plastic, and may be transparent plastic but need not be transparent. The base portion 10 has an outer casing wall with openings 20, a floor 18. The cover 1 extends to the periphery of the outer casing walls of the base 10 and may also be of any suitable material. Cover 1 (as in the case with the base portion 10) may be opaque or transparent, or be partly opaque and partly transparent. When a suitable portion of the cover, or all of it, is transparent, the bait 26 may be readily seen. Although the cover has been illustrated as a flat disk with a central depression 2, it will be readily apparent that it could also have an outer wall extending downwardly over the outer wall, so long as the openings to the tunnel entrance 20 are not obstructed. Cover 1 is permanently affixed to the base, as by adhesion or any suitable means. The base 10 is preferably molded in one portion to include the bridge member 11 and tunnel member 14 which cooperate together with a cover member 1 may be permanently affixed as by adhesive, sonic welding, or any suitable means to the base member 10.

In one embodiment, the base portion 10 and the cover 1 are both of opaque plastic. In another embodiment, the base portion 10 is opaque and the cover 1 is transparent. In yet another embodiment, the base portion 10 and the cover 1 are both transparent. Obviously, a portion or portions of the floor and/or cover may be transparent and the remainder opaque. Insects may enter the device through the tunnel entrance 20 and are guided by the curved walls of the tunnel and bridge 11 to the access port 12 to reach the bait in the interior of the base 10.

Although insects may easily reach the bait by access into the tunnel entrance 20 and access port 12, it will be readily apparent from FIGS. 1 and 2 that a probe placed in access port 12 in the base 10 will not enter the interior 13 of the base 10 to extract bait therefrom. Due to the depression 2 in the cover 1 placed in close proximity to the access port 12, a probing device would be deflected and restricted from entering the interior 13 of the base 10. Similarly, the depression 2 in cooperation with the access port 12 will restrict the removal of granular bait from the interior 13 when the station is tilted or shaken. Thus, the station is designed to minimize spillage of granules, but still allow insects a way to access the bait and to leave the station to return to the nest or colony.

FIG. 3 shows a plan view with the cover removed exposing the interior configuration of the station according to the present invention. As illustrated in FIG. 3, an embodiment of the invention shows the interior of the station with perpendicularly arranged tunnel 14 and bridge 11, with centrally located access port 12. The interior walls 15 of the tunnel and cooperating bridge provide guiding walls which serve to direct the insects toward the access port 12 so that they will be more likely to enter the insect feeding station. Once in the interior 13 of the feeding station base, the insects are free to extract granular materials and exit through the access port 12 and return to the nest or colony.

FIGS. 4 and 5 show half-sections of side elevations taken on lines 4—4 and 5—5, respectively and show the interaction of the depression 2 in the cover 1 with the access port 12 in the arcuate bridge located in the base 10. It is noted that the walls of the tunnel and bridge members have a curvature such that insects entering the tunnel opening 20 will be guided along the walls to the access port 12. At the same time, poison granular bait placed in the interior of the base 10 cannot easily be removed from the sealed bait station.

Figure 6:
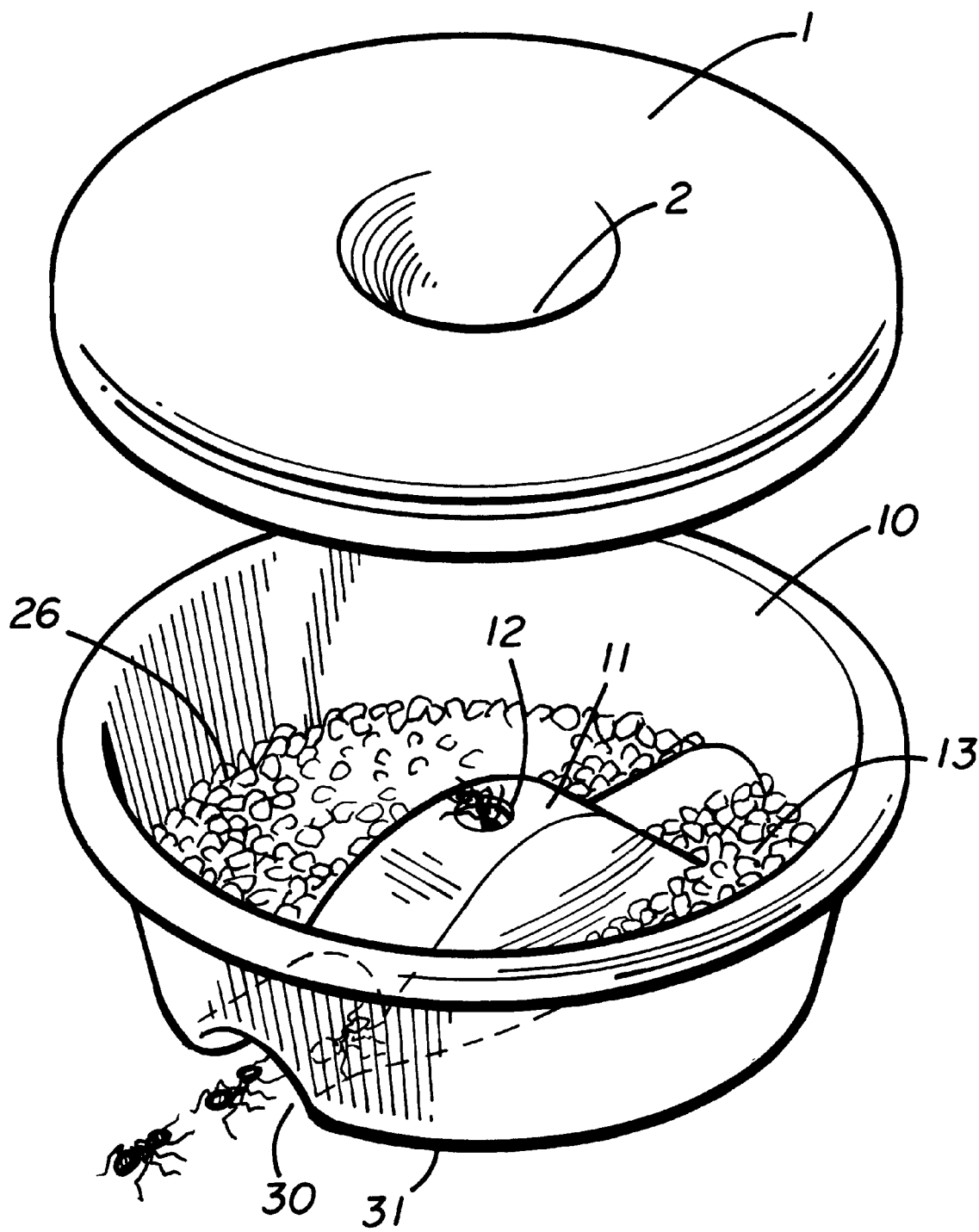
FIG. 6 is an alternative embodiment of the insect bait station according to the present invention.

FIG. 6 shows an alternative preferred embodiment of the apparatus 10 for receiving a bait which contains an insecticide ingredient according to this invention. The station similarly includes base member 10 and a cover member 1. The base member 10 has a transverse bridge member extending from opposite sides of the base perimeter 31 openings to the entrance 30. This would allow the insects to enter the lower portion of the bait station through entrances 30 and by using the walls of the bridge 11 have access to the port 12 to reach the bait in the interior of the base 10. Similarly, the depression 2 in cooperation with the access port 12 restricts the removal of granular bait from the interior 13 when the station is tilted or shaken. Thus the design of the station according to this alternative embodiment similarly minimizes spillage of granules, but still allows insects a way to access the bait and to leave the station to return to the nest or colony. As illustrated in FIG. 6, this embodiment of the invention removes the necessity for the perpendicular tunnel intercepting with the bridge 11 as described hereinabove.

The method of the invention for offering a granular insect bait to targeted insects includes the step of providing an insect bait station made in accordance with the above description of the insect bait station of the invention and including within the interior thereof a selected granular insect bait. The insect bait station so provided is then placed in a location frequented by the targeted insects. Each of the embodiments of the insect bait station, described above, is suitable for practice of the method of the invention.

The cover and base of all of the embodiments disclosed above of the insect bait station of the invention, together with the feeding structure of the last embodiment disclosed, may be molded or otherwise formed from conventional plastics by conventional means well known to those skilled in the art. The cover and base may be made separately and then joined in granular tight relation, either before or after the additional of a granular insect bait, by ultrasonic welding, spin welding, heat sealing, producing a seal by a snap-on fit, or similar, conventional techniques for fabricating plastic objects. The insect bait stations shown in the drawings are round, but the invention should not be deemed limited to that shape. Insect bait stations of the invention may be any convenient shape.

The invention has practice industrial application in the presentation of granular insect bait to attract insects, which may be done for any of a number of monitoring or control purposes. When control is desired, the granular insect bait would include an appropriate insecticide. The insect bait station of the invention is useful with crawling insects, such as ants, roaches, earwigs, silverfish, and the like.

It will be seen that each of the above-described embodiments are similar to each other. Consequently, it will be seen that each provides a unique yet effective device for presenting bait to insects, especially ants, from a non-spillable container wherein granular bait, as well as, gels or pastes may be used. Numerous modifications of the preferred embodiments and features disclosed herein will undoubtedly occur to those of skill in the art and it should be understood that the spirit and scope of the invention is to be limited solely by the appended claims.

What is claimed is:

1. An insect bait station for administering bait to insects wherein said bait station comprises a base member having an outer wall and bottom;

and a cover portion secured thereto to form a concave interior in the base;

said bottom is provided with exterior openings thereunder to form a tunnel and further said bottom having an arcuate bridge member formed thereon in cooperation with said tunnel;

said arcuate bridge member having a substantially centrally located access port leading to said interior of the base;

said cover member having an indentation placed in close proximity to the access port in the bridge of said base member.

2. The bait station of claim 1 wherein said interior of the base is accessed from said tunnel and bridge.

3. The bait station of claim 1 wherein said indentation in said cover member restricts removal of granular bait when the station is tilted or shaken.

4. The bait station of claim 1 wherein said cover member is extends downwardly over the base member outer wall without obstruction of the exterior openings to the tunnel.

5. The bait station of claim 1 wherein said cover portion contains a transparent portion.

6. The bait station of claim 1 wherein said base member contains a transparent portion.

7. The bait station of claim 1 wherein said cover portion is attached to the base member and said indentation in said cover is positioned over the access port in the bridge so as to allow insects to access the bait therein and to leave the station with bait.

8. The bait station of claim 1 wherein said bridge member extends from opposite sides of the bottom exterior openings thereunder, said bridge member having a substantially centrally located access port leading to said interior of the base whereby said interior of the base containing the bait is accessed therefrom.

* * * * *